United States Patent [19]
Dubois

[11] Patent Number: 6,125,693
[45] Date of Patent: Oct. 3, 2000

[54] TEST FIXTURE FOR SIMULTANEOUS EVALUATION OF STEAM PIPE HYDROSEALING METHODS

[75] Inventor: Neil J. Dubois, Cranston, R.I.

[73] Assignee: The United States of America as represented by the Secretary of the Navy, Washington, D.C.

[21] Appl. No.: 09/152,468

[22] Filed: Sep. 8, 1998

[51] Int. Cl.[7] .................................................. G01M 3/04
[52] U.S. Cl. .............................. 73/46; 73/49.1; 73/49.5
[58] Field of Search .............................. 73/46, 49.1, 49.5

[56] References Cited

U.S. PATENT DOCUMENTS

| | | | |
|---|---|---|---|
| 2,578,728 | 12/1951 | Musser | 73/49.5 |
| 2,612,286 | 9/1952 | Stufft | 73/49.5 |
| 3,842,659 | 10/1974 | Bacroix | 73/49.5 X |
| 3,871,209 | 3/1975 | Hasha | 73/49.1 |
| 4,458,522 | 7/1984 | Toelke | 73/49.5 |
| 4,624,131 | 11/1986 | Holm et al. | 73/46 |
| 4,646,561 | 3/1987 | Toelke | 73/49.5 |
| 5,209,105 | 5/1993 | Hasha et al. | 73/49.1 |

*Primary Examiner*—Daniel S. Larkin
*Attorney, Agent, or Firm*—Michael J. McGowan; James M. Kasischke; Prithvi C. Lall

[57] ABSTRACT

A test fixture for the simultaneous evaluation of a plurality of seals including an outer tubular shell having a first terminal end and a second terminal end. A first bulkhead has interior and exterior sides to cover the first terminal end of the tubular shell and a second bulkhead has interior and exterior sides to cover the second terminal end of the tubular shell. A sleeve has a first terminal end and a second terminal end and is positioned inside the exterior tube. The sleeve may be segmented into two sections connected end to end. One end of the sleeve is fixed to a simulated pipe flange and sealed by a coaxial overlapping seal. The other end of the flange is connected to an adapted ring by a similar seal. Another such seal is used to connect the two segments of the sleeve.

11 Claims, 2 Drawing Sheets

TEST FIXTURE FOR SIMULTANEOUS EVALUATION OF STEAM PIPE HYDROSEALING METHODS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to apparatus and methods for testing, and more particularly, to a test fixture which allows for simultaneous evaluation of several sealing devices for a high temperature steam pipe assembly in a flooded environment.

(2) Description of the Prior Art

The prior art discloses various methods and apparatus for testing pipes.

U.S. Pat. No. 3,871,209 to Hasha discloses a test fixture and method of use for testing hydroseal connections between two pipes. The test fixture shown allows for pressurized fluid to be pumped around the connection.

U.S. Pat. No. 4,194,389 to Lading discloses a test fixture for pressure testing hydroseal connections between two pipes. The test fixture allows for pressurized fluid to be pumped around the connection.

U.S. Pat. No. 4,407,171 to Hasha et al. discloses a test fixture for testing the hydroseal at the end of a pipe on which a threaded manifold and test pad are coupled to the threaded manifold end of the pipe in the same way that another pipe section would be coupled thereto.

U.S. Pat. No. 4,624,131 to Holm et al. discloses a test fixture for testing the seal of a pipe connection. The fixture is formed of two halves that are brought together about the connection.

U.S. Pat. No. 5,209,105 to Hasha et al. discloses a test fixture for hydrostatically testing connections between two sections of pipe joined by a threaded coupling. A housing forms a chamber about the coupling or pipe interface and pressurized fluid is pumped into a chamber.

The acoustic measurement of noise caused by torpedo drive train systems is sometimes measured in a large fluid filled structure in which the torpedo is mounted. In one possible application, high-pressure steam can be used to power the vehicle for subsequent noise testing. This steam is transported to the vehicle via a piping system which runs from the steam generation source through the structure's wall and then to the vehicle.

In this environment, the steam pipe is encased in thermal insulation and a protective plastic sleeve to seal the insulation from the surrounding fluid. Where the steam pipe passes through the flooded structure wall and where there is any break in the plastic sealing sleeve, means must be employed to maintain the fluid tight integrity of the system.

SUMMARY OF THE INVENTION

It is an object of this invention to provide a means for testing the seals employed in this system before they are emplaced in the system.

It is a further object of this invention to provide such a testing means which tests all of the three primary seals simultaneously.

The present invention is a test fixture for the simultaneous evaluation of a plurality of seals. This fixture includes an outer tubular shell having a first terminal end and a second terminal end. A first bulkhead having an interior and exterior side covers the first terminal end of the tubular shell. A second bulkhead also having an interior and exterior side is mounted to cover the second terminal end of the tubular shell. A sleeve having a first terminal end and a second terminal end is positioned inside the tubular shell. A first sleeve mounting means is positioned on the first bulkhead and is fixed to the first terminal end of the sleeve. A second sleeve mounting means is positioned on the second bulkhead and fixed to the second terminal end of the sleeve. A first sealing means is positioned between the first sleeve mounting means and the sleeve, and a second sealing means is positioned between the second sleeve mounting means and the sleeve. Preferably, the sleeve will be medially segmented into two sections that will be joined by a collar seal. This invention, therefore, allows for the simultaneous testing of all the primary seals used in the piping system.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT

Figure 1:
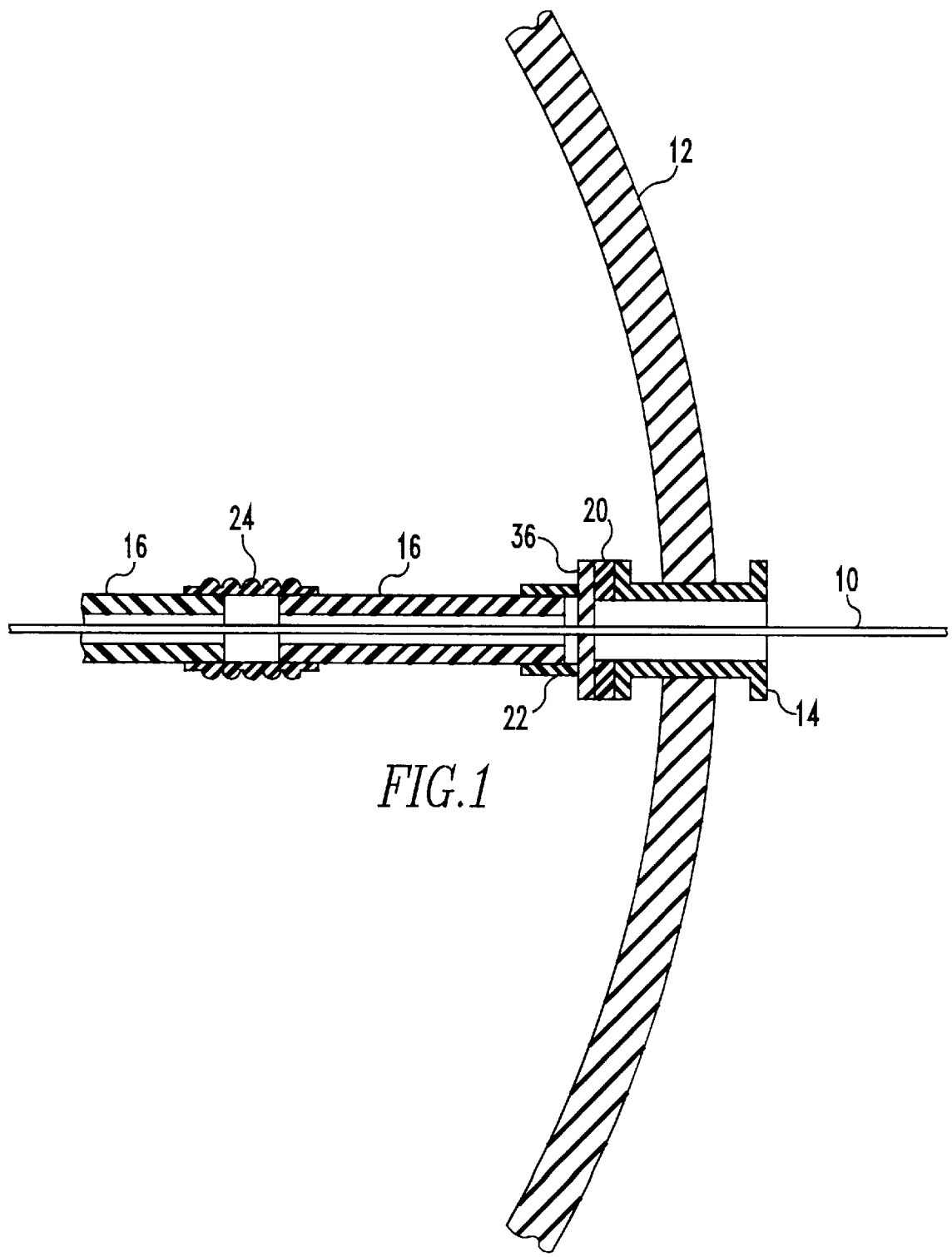
FIG. 1 is a cross sectional schematic view of a steam pipe passing through the wall of a fluid filled structure.

The invention is a test fixture for the simultaneous evaluation of steam pipe hydrosealing methods. Referring to FIG. 1, a steam pipe 10 passes through the wall 12 of a fluid filled structure via a connection flange 14. Internal to the structure, the steam pipe assembly is encased in a plastic sealing sleeve 16. Where the pipe assembly passes through and is connected to the wall 12, it must be sealed in two places, at the connection flange gasket 20 and the sleeve end seal 22. Where there is a break in the plastic sleeve 16, an additional seal 24 must be employed.

Figure 2:
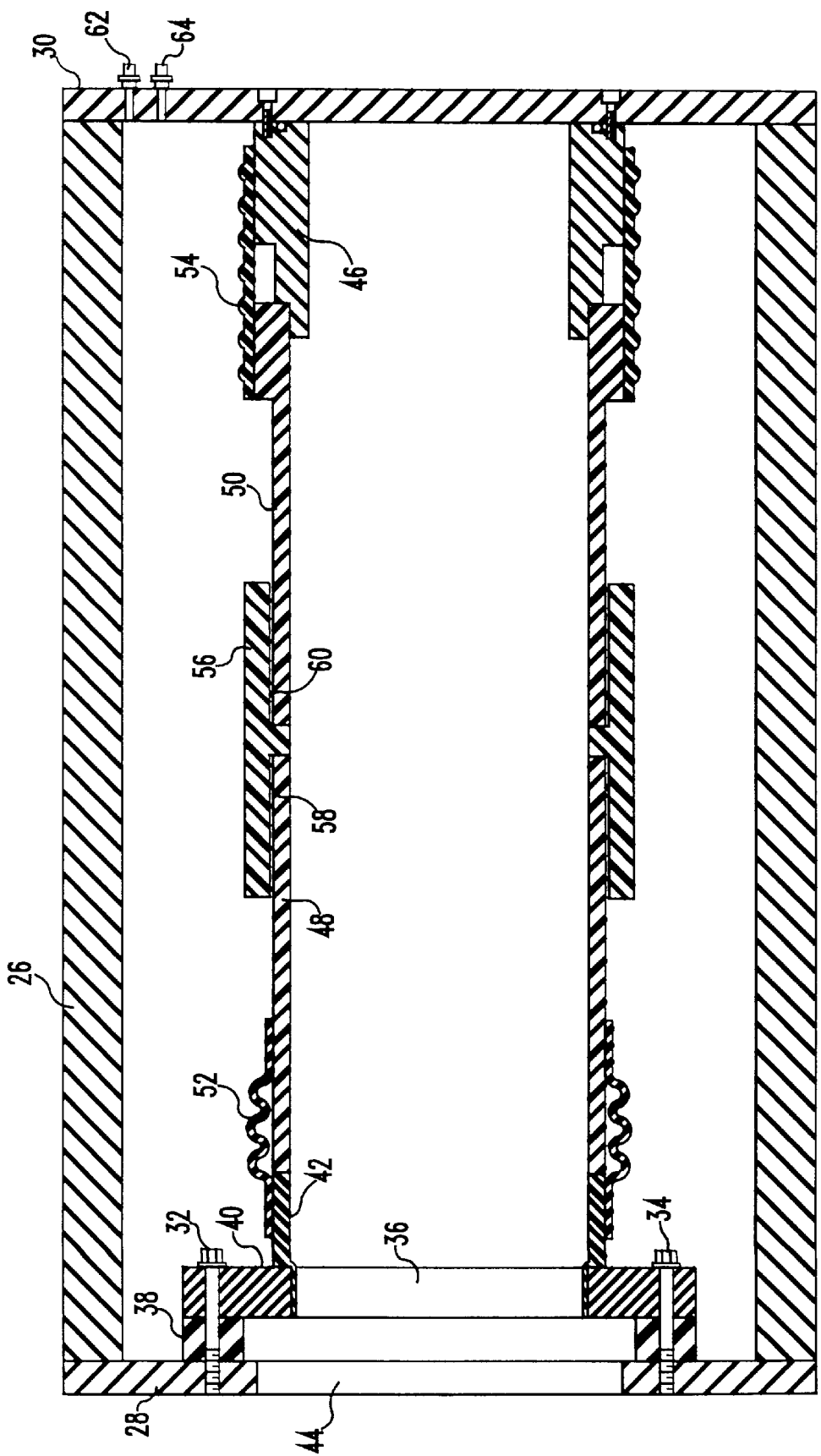
FIG. 2 is a cross sectional schematic view of a preferred embodiment of the test fixture of the present invention.

The test fixture of the present invention is shown in FIG. 2. It consists of a forty-eight inch long cylindrical tubular shell 26 with bulkheads 28 and 30 on each terminal end of the shell 26. It will be appreciated by those skilled in the art that while a tubular shell is shown in the drawings, a wide variety of differently shaped housings may be substituted for this structure. The left bulkhead 28 has a pattern of bolt apertures therein. This bolt pattern emulates the flange connection 14 of the large fluid filled structure. The actual pipe flange 36 and sealing gasket 38 used in the steam pipe assembly are mounted to left bulkhead 28 by bolts 32 and 34. The pipe flange 36 contains a transverse section 40 and an axial section 42. The left bulkhead 28 also has a viewing port 44. The right bulkhead 30 is configured to accept an adapter ring 46. Sections of polyvinyl chloride (PVC) plastic sleeves 48 and 50 of identical diametral dimensions as the steam pipe assembly join with the bulkheads 28 and 30. Also located on the right bulkhead 30 are ports 62 and 64. Port 62 is used for filling the test section and port 64 for pressurizing the test section. Sleeve 48 mates with axial section 42 of pipe flange 36 and is circumferentially sealed by first seal 52.

Sleeve 50 mates with adapter ring 46 and is circumferentially sealed by second seal 54. First and second seals 52 and 54 are preferably made from polyvinyl chloride (PVC) or another elastomeric material. The seals 52 and 54 are joined to the structure by frictional fits.

A center guide collar 56 is located between the two sleeves 48 and 50, and sealed against them with O-ring seals 58 and 60. The center guide collar 56 allows for both bulkheads to be assembled with their respective seals and sleeve pieces. Both can then be slid into the shell 26 by detaching the bulkheads 28 and 30. At this point, the sleeve sections 48 and 50 self center on the guide collar 56, slide past the O-ring seals 58 and 60 and form a completely sealed assembly which can then be filled and pressurized.

The large center hole viewing port 44 is cut out of left bulkhead 28 allowing for visual access to the inside of the sleeves 48 and 50. This allows for leak inspection and localization during testing. The test fixture may be mounted on flange 14 in the structure shown in FIG. 1.

The advantage of the invention is its ability to test several seals simultaneously at various hydrostatic pressures with visual leak check capability. Thus, system hydroseal integrity can be evaluated in a single test. Any failure can be visually localized.

While the present invention has been described in connection with the preferred embodiments of the various elements, it is to be understood that other similar embodiments may be used or modifications and additions may be made to the present described invention without deviating therefrom. Therefore, the present invention should not be limited to any single embodiment, but rather construed in breadth and scope in accordance with the recitation of the appended claims.

What is claimed is:

1. A test fixture for the simultaneous evaluation of a plurality of seals comprising:

a shell having a first terminal end and a second terminal end and defining a cavity therein;

a first bulkhead having exterior and interior sides mountable to cover the first terminal end of the shell;

a second bulkhead having exterior and interior sides mountable to cover the second terminal end of the shell;

a sleeve having a first end and a second end positionable inside the cavity of the shell, said sleeve being made from at least two sleeve portions and at least one collar, and said at least one collar sealing said at least two sleeve portions together;

at least two sleeve mounting means, a first sleeve mounting means positioned at the first bulkhead and a second sleeve mounting means positioned at the second bulkhead, and each sleeve mounting means being positioned at one end of said sleeve; and at least two sealing means, each positioned about one sleeve mounting means and the proximate end of said sleeve.

2. The test fixture of claim 1 wherein one of said at least two sleeve mounting means is a pipe flange having an axial section positioned against said sleeve end and a transverse section peripherally extending from the axial section and mounted to one of said first and second bulkheads.

3. The test fixture of claim 2 wherein at least one of said sealing means is tubular and coaxially overlaps the sleeve and the pipe flange axial section.

4. The test fixture of claim 3 wherein said at least one sealing means is made from an elastomeric material.

5. The test fixture of claim 1 wherein one of said at least two sleeve mounting means is an adapter ring having a distal end with an outer surface conforming to an inner surface of said sleeve, one of said sleeve ends being mounted about said adapter ring's distal end.

6. The test fixture of claim 5 wherein at least one of said sealing means is tubular and coaxially overlaps the sleeve and the adapter ring.

7. The test fixture of claim 6 wherein said at least one sealing means is made from an elastomeric material.

8. The test fixture of claim 1 further comprising:

a filling port in communication with the interior of said shell for filling said shell cavity; and a pressurizing port in communication with the interior of said shell for pressurizing said shell cavity.

9. The test fixture of claim 8 wherein said first bulkhead has a window formed therein for allowing viewing of the interior of said sleeve and said sleeve mounting means.

10. The test fixture of claim 1 wherein said sleeve comprises:

a first sleeve portion having said first end and a first medial end;

a center guide collar capable of sliding about said first medial end of said first sleeve portion; and a second sleeve portion having said second end and a second medial end capable of sliding into said center guide collar.

11. The test fixture of claim 10 wherein said center guide collar conforms to the outer surface of said first and second sleeve portions, and said center guide collar has seals therein for sealing said center guide collar to said first and second sleeve portions.

* * * * *